United States Patent
Houck

[15] 3,684,244
[45] Aug. 15, 1972

[54] DUO-BLOCK SAFETY DEVICE

[72] Inventor: Theodore B. Houck, 3636 S. Florence Place, Tulsa, Okla. 74105

[22] Filed: Aug. 5, 1970

[21] Appl. No.: 61,142

[52] U.S. Cl...............254/173 R, 192/70.3, 192/139
[51] Int. Cl. ...............................................B66d 1/48
[58] Field of Search......254/145, 146, 168, 187, 173; 192/70.23, 70.24, 70.3, 93, 138, 139

[56] References Cited

UNITED STATES PATENTS

| | | | |
|---|---|---|---|
| 3,101,828 | 8/1963 | Wilson | 192/139 |
| 2,899,038 | 8/1959 | Wellauer | 192/68 |

Primary Examiner—Evon C. Blunk
Assistant Examiner—Johnny D. Cherry
Attorney—Head & Johnson

[57] ABSTRACT

A safety stop for a traveling block of a drilling rig utilizes a cam carried by and rotating in unison with a shaft which in turn is driven in geared relationship by the rotating shaft of the power winding drum of the traveling block. A cam follower actuated valve initiates means to stop the travel of the block at the upper and lower limits.

By disengaging a floating clutch, an operator can rotate the cam relative to its carrying shaft to quickly and easily adjust the upper and lower stop limits of the traveling block.

2 Claims, 6 Drawing Figures

INVENTOR.
THEODORE B. HOUCK

BY Head & Johnson

ATTORNEYS

INVENTOR.
THEODORE B. HOUCK
BY
Head & Johnson
ATTORNEYS

INVENTOR.
THEODORE B. HOUCK

BY *Head & Johnson*

ATTORNEYS

DUO-BLOCK SAFETY DEVICE

CROSS REFERENCE

This application is not related to any known U.S. or foreign patent application.

BACKGROUND OF THE INVENTION

This apparatus pertains to safety devices and more particularly to a safety stop device for a traveling block drilling rig. Safety traveling block stops have heretofore been known for limiting the upward and/or downward movement of a traveling block. One type of such traveling block stop device which controls both the maximum upward and downward movement of the traveling block utilizes a cam to control the actuation of valve means which in turn controls the inverse actuation of a power winding drum clutch and brake to stop travel of the block. The cam is fixedly carried on shaft which is driven in geared relationship to the shaft on which the power winding drum is mounted; the gearing being such that the driven shaft rotates less than 360° during maximum travel of the block.

A disadvantage presented by this type of clutch oriented stop mechanism is the fact that since the cam is rigidly secured to the output shaft of the gear reduction unit, the upper and lower stop limits can be adjusted only by using hand tools to detach the cam from the shaft, rotating the cam relative to the shaft and then rigidly reattaching the cam to the shaft for common rotation therewith. This procedure is tedious and time-consuming.

It is therefore an object of this invention to present a cam operated safety stop device for a traveling block having means thereon for quickly and easily adjusting the upper and lower stop limits of the block.

It is another object of this invention to present a cam operated safety stop device wherein the engagement and disengagement of the cam with the output shaft of the gear reduction unit is controlled by clutch means.

A still further object of this invention is to present a cam operated safety stop device for the traveling block of a drilling rig wherein the rotation of the cam in unison with the outward shaft of the gear reduction unit is controlled by a clutch having means thereon for adjusting the tension of engagement of the clutch with the cam.

It is still a further object of this invention to present a cam operated safety stop device for a traveling block of a drilling rig having means on the cam for adjusting the length of the travel of the block between upper and lower stop limits.

SUMMARY OF THE INVENTION

Generally the invention presents a cam operated safety stop device for a traveling block of a drilling rig wherein the cam is carried on the output shaft of a gear reduction unit which in turn is interconnected to and driven in geared relationship with the shaft on which the power winding drum of the traveling block is mounted. A clutch controls engagement and disengagement of the cam with the output shaft of the gear reduction unit. In the disengaged position, the cam is free to rotate relative to the shaft such that the position of the upper and lower stop limits of the traveling block can be adjusted. In the engaged position, the cam rotates in unison with the output shaft of the gear reduction unit to actuate a desired upper and lower stop limit circuitry which in turn stops the rotation of the power winding drum.

DETAILED DESCRIPTION OF THE DRAWINGS

DETAILED DESCRIPTION OF THE PREFERRED EMBODIMENT

Figure 1:
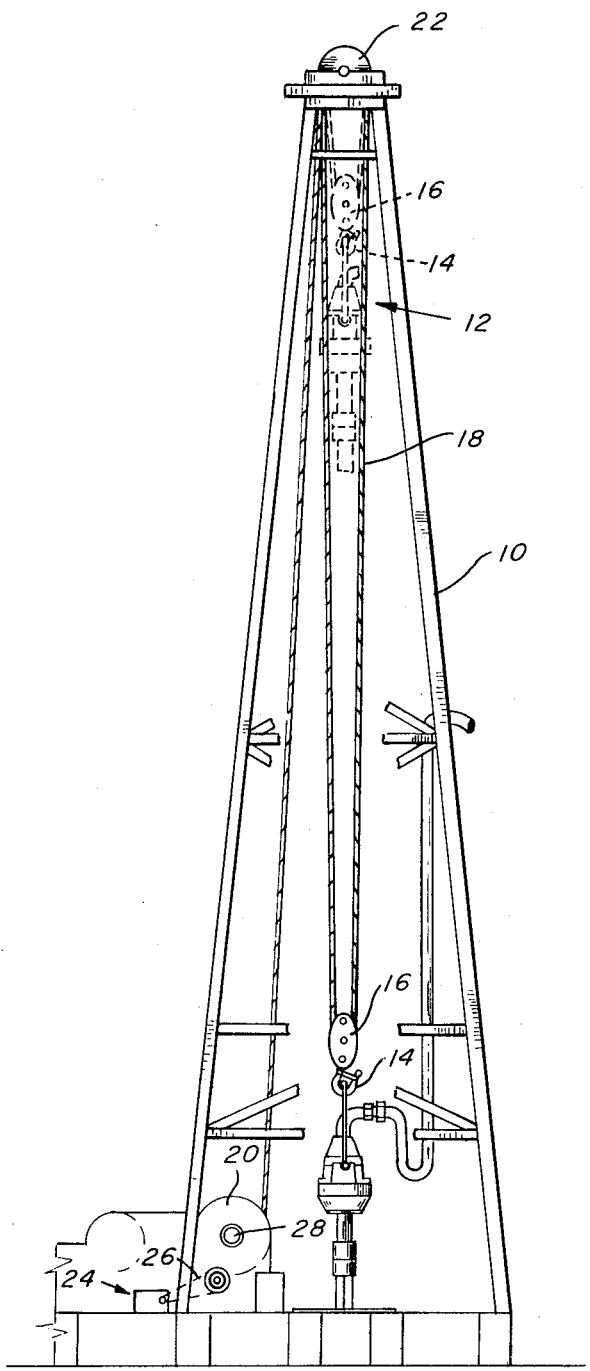
FIG. 1 is a side view of a drilling derrick having installed thereon a traveling block system and showing the safety stop device interconnected to the power winding drum shaft thereof.

Looking now at FIG. 1 of the drawings, the numeral 10 designates a drilling rig derrick having installed thereon a drilling rig hoist mechanism or draw works generally denoted as 12. A swivel 14 is suspended from a traveling block 16 which in turn is suspended on a cable 18. The cable passes off of a drum 20 and over crown block sheaves 22 which support the traveling block 16 for upward and/or downward movement within derrick 10 as is well understood in the art.

The traveling block safety stop device which is designated generally as 24 is attached through a chain and sprocket arrangement 26 or other suitable means to the power winding drum shaft 28 which shaft rotatably carries the power winding drum 20.

Figure 2:
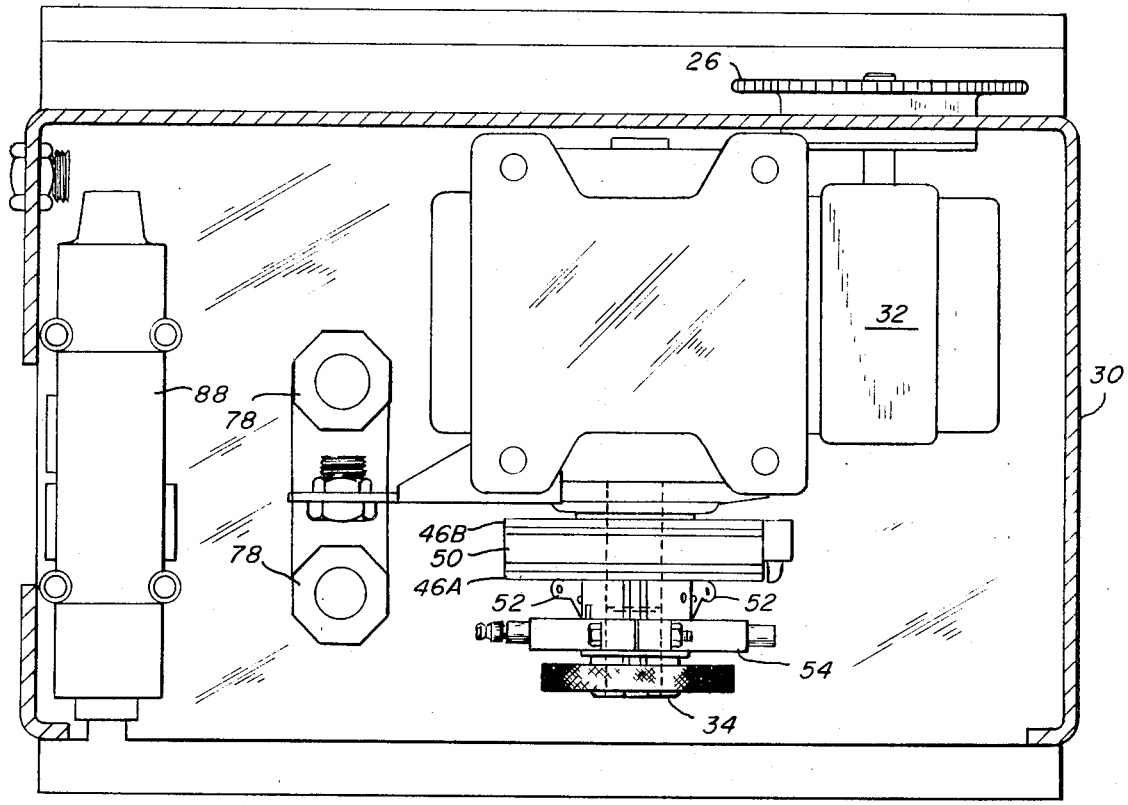
FIG. 2 is a top view of the safety stop device of this invention.
Figure 3:
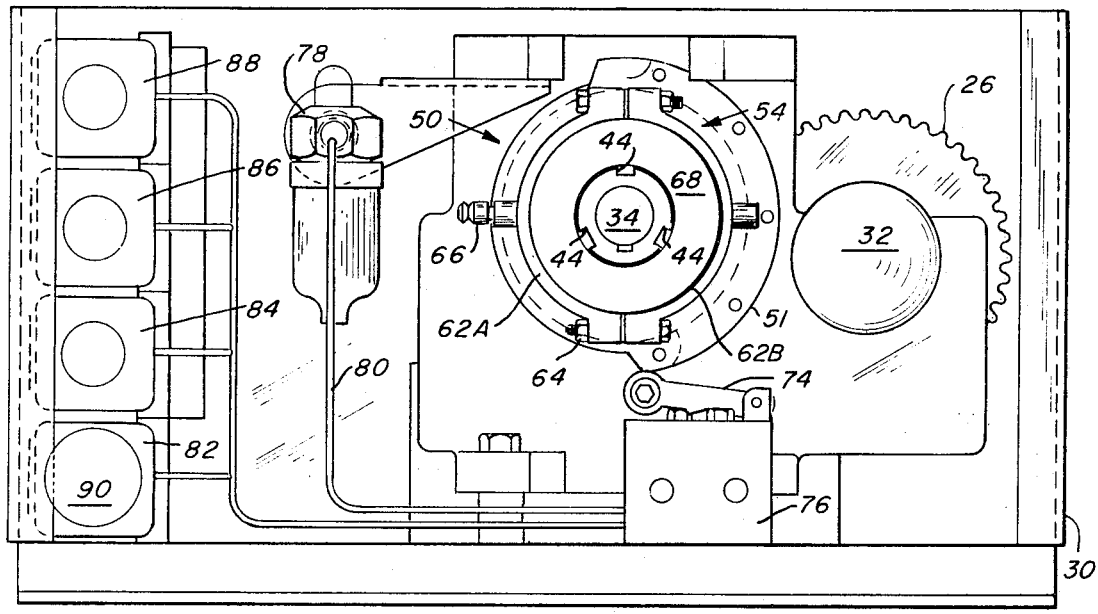
FIG. 3 is a side view of the safety stop device of this invention.

Turning now to FIGS. 2 and 3 of the drawings, the safety stop device can be housed in an enclosure 30 if desired. Chain and sprocket 26 driven by the drum shaft 28 feeds the drive shaft of a gear reduction unit 32 which has a bidirectional output shaft 34. Gear reduction unit 32 has a low speed gear ratio such that the rotation of output shaft 34 is less than 360° for the maximum desired travel of the traveling block 16.

Figure 4:
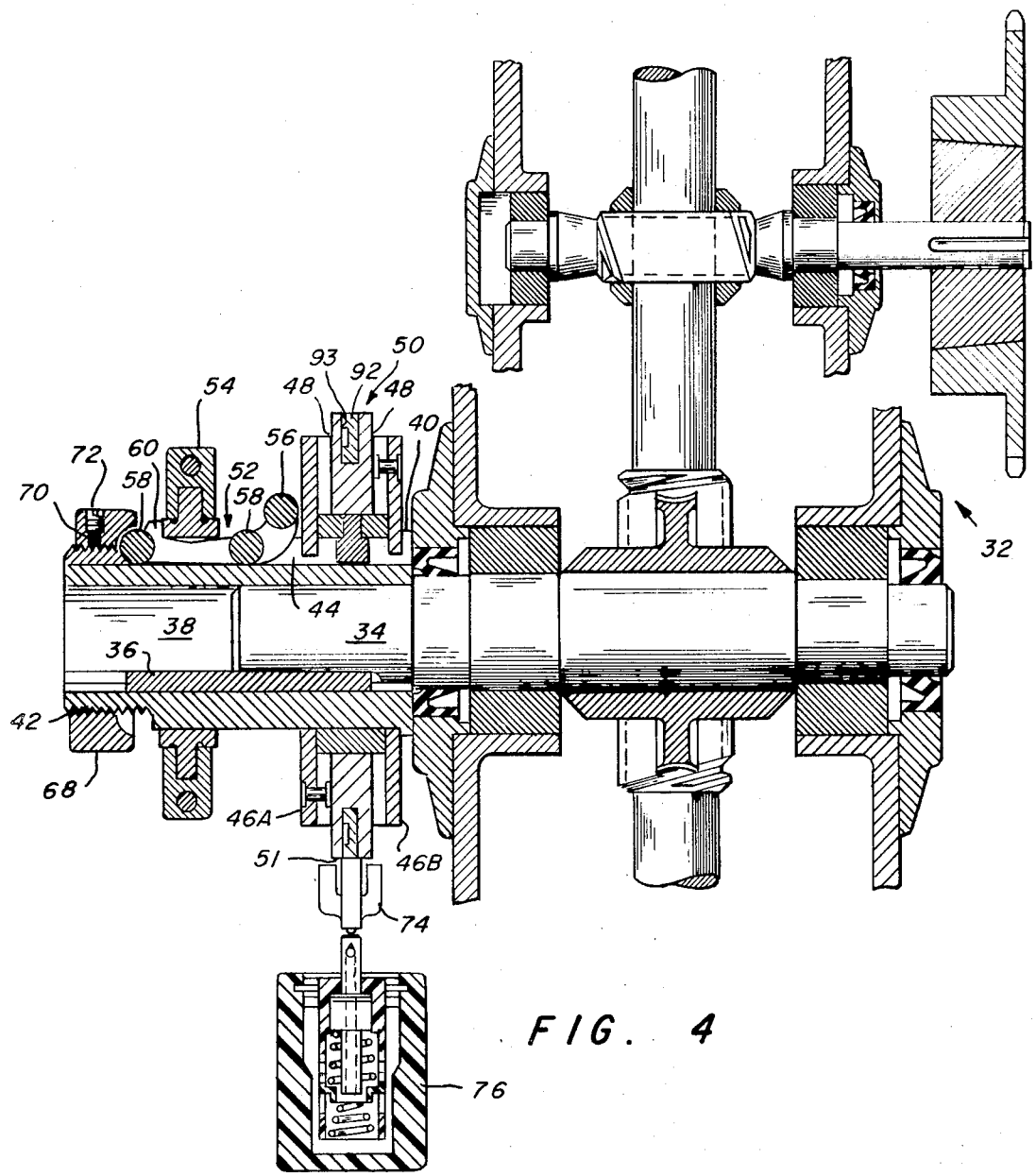
FIG. 4 is a cross-sectional side view of the safety stop device of this invention.

Referring now to FIG. 4, coaxially received on output shaft 34 and keyed thereto by means of key 36 is a tubular hub 38. The subsequent discussion of the components of the block safety device will be described in reference to hub 38; nevertheless it is to be understood that if desired output shaft 34 can directly receive these components discussed thereby eliminating the need for hub 38. However, by the use of hub 38 a standard commercially available gear reduction unit can be purchased and used without modification. The rearward portion of hub 38 is bounded by a perpendicular lip 40 around the periphery thereof and the forward portion is reduced diameter and contains male threads 42.

Equidistantly spaced around the periphery of hub 38 are a plurality of longitudinal grooves 44 which progress the length of the hub and which receive the tongues of spaced apart annular clutch plates 46A and 46B coaxially sleeved over hub 38. Clutch plate 46 abuts against lip 40.

As can be appreciated clutching plates 46A and 46B so received on hub 38 are affixed to the hub for common rotation therewith but are capable of longitudinal movement relative to each other and to hub 38 between a first engaged position and a second disengaged position.

Affixed to the confronting sides of clutch plates 46A and 46B are annular friction materials 48 which are adapted in the engaged position of the clutching plates to fixedly engage a cam disc 50 having a cam portion 51 sleeved over hub 38 and sandwiched between clutching plate 46A and 46B. Cam disc 50 in the disengaged position of the clutching plates is rotatable relative to hub 38 and output shaft 34 and in the engaged position is fixedly interconnected to hub 38 for rotation in unison with hub 38 and output shaft 34.

Longitudinal movement of the clutching plates 46A and 46B relative to each other is controlled by a plurality of dogs 52 which in turn are controlled by a manually operable ring clutch 54.

Each dog has a flared rearward end bearing against the outer surface of forward clutching plate 46A and includes a plurality of rollers 58 which enable the dog to rock inwardly and outwardly. Ring clutch 54 surrounding the dogs 52 and retaining them within grooves 44 is adapted on being manually pushed rearwardly to force the flared end 56 of dogs 52 inwardly about the intermediate roller which in turn forces the clutching plates into frictional engagement with cam disc 50 thereby interlocking the hub for common rotation. On reverse movement of ring clutch 54 that is on being drawn forwardly ring clutch 54 bears against a projection 60 on the forward end of the dogs to cause flared ends 56 to rock outwardly to disengage the clutch plates from cam disc 50 thereby rotatably disconnecting the cam disc from the hub and enabling the cam disc to be rotated relative to the hub and output shaft.

Ring clutch 54 may be constructed as a continuous circular piece or may be comprised of two semi-circular components 62A and 62B secured together as by bolts 64 as shown in FIG. 3. A zerk fitting 66 for receiving grease or other lubricant facilitates the operation of the ring clutch. The frictional tension with which clutching plates 46A and 46B engage cam disc 50 is adjustably determined by an annular tensioning nut 68 which is threadably received on threads 42 on the reduced diameter end of hub 38 and which has an arcuate surface abutting the forward rollers 58 of dogs 52. Clockwise rotation of tensioning nut 68 longitudinally slides the dogs 52 forwardly to increase the frictional tension engagement of the clutching plates with cam 50. Counter-clockwise rotation reduces such tension. The inner surface of tension ring 68 includes a slot having received therein a metallic bar 70 which is transversely movable by means of a set screw 72. Once the proper tension has been determined the metallic bar is moved inwardly to bear against threads 42 on the hub thereby locking the tensioning nut 68 in a fixed position.

Bindingly engaging the peripheral edge of cam disc 46 and responsive to the angular position thereof is a spring-loaded cam follower actuator arm 74 of a pilot switch 76. Cam follower actuator arm 74 functions in the same manner as standard cam follower actuators known in the art in; that as cam disc 50 rotates in unison with the output shaft 34, the actuator is responsive to the profile of cam disc 50 and, as it rides onto the cam portion, is depressed to activate pilot switch 76.

Figure 5:
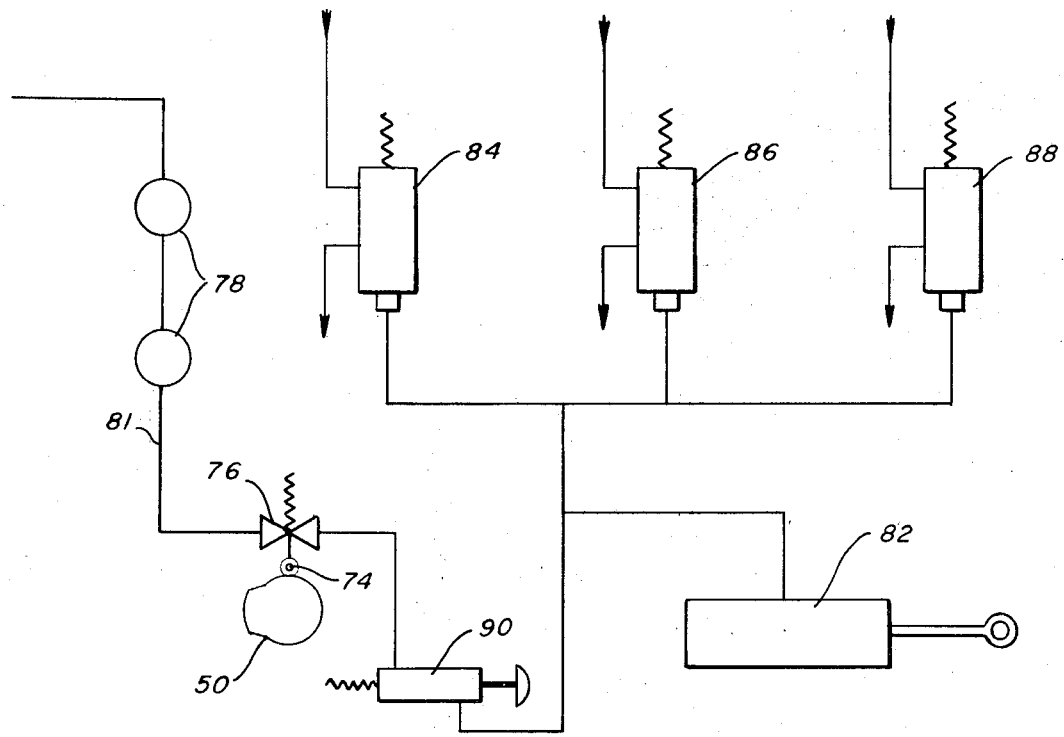
FIG. 5 shows schematically a typical circuit utilizing the safety stop device of this invention.

Pilot switch 76 is interconnected to and initiates circuitry to stop travel of the block 16 as it reaches either the predetermined upper or lower stop limits. Pilot switch 76 and associated circuitry employ commercially available components and may be either electrical, hydraulic, or pneumatic. For example pilot switch 76 may be connected to an air reservoir through filters 78 through conduit 80 and the outlet thereof may be connected in parallel to the control ports of a brake actuator cylinder 82, valve, a high clutch air line valve 84, a low clutch air line valve 86 and a throttle control air line valve 88 as is shown in FIG. 3 in a manner known in the art; a typical schematic of which is shown in FIG. 5. A reset valve 90 may be inserted in the circuitry as shown in FIG. 5. Upon depression of the actuator of the reset valve, the block safety device is bypassed thereby enabling the traveling block to be moved beyond the stop limits. The circuitry for use of electrical or pneumatic components is similar to the previously discussed circuit for air components and is known to one skilled in the art.

In operation, ring clutch 54 is drawn forwardly to disengage clutching plates 46A and 46B from cam disc 50, and the cam disc is then rotated relative to hub 34 until the profile of the cam disc 50 is in a position relative to the cam actuator arm 74 which effect the desired upper and lower stop limits of the traveling block 16. Clutching plates 46A and 46B are then forced into engagement with the cam disc 50 in the manner as previously discussed to interlock cam disc 50 with shaft 34 and tubular hub 38 for common rotation therewith. The device is now ready for operation. During operation, the traveling block 16 is raised and lowered by rotation of power winding drum 20 mounted on shaft 28 in the usual manner.

Output shaft 34 rotates in geared relationship to the rotation of shaft 28. When the traveling block 16 reaches the desired upper or lower stop limit, cam actuator arm 74 will ride up onto cam portion 51 of cam disc 50 and be depressed to actuate pilot switch 76 which in turn simultaneously actuates the brake actuator cylinder 82 and clutch valves 84 and/or 86 and the air throttle device 88 to stop the rotation of the power winding drum 20, by disconnecting the hoist drum clutches dumping the engine throttle and setting the drum brake.

Upon reversing the rotation of the power winding drum, the cam follower actuator arm 74 will overrun cam portion 51 and return to its normal position. Operation of the traveling block then continues in the normal manner until cam follower actuator arm 74 is again depressed.

Wen it is desired to change the upper and lower stop limits, clutching plates 46A and 46B are disengaged from cam disc 50, the disc rotated relative to shaft 34 and hub 38 to a position which effects the desired new upper and lower limits and the clutching plates 46A and 46B are again engaged to frictionally interconnect cam disc 50 to the shaft for a rotation therewith.

The safety device as discussed heretofore while enabling the upper and lower stop limits to be adjustably varied, does not have the capability of adjusting the length of travel of block 16 between the upper and lower stop points since the profile of cam disc 54 is not changed.

Referring back to FIG. 4, this capability of adjusting the length of travel of block 16 between the upper and lower stop points is attained by a cam ring 92 slidably received in a groove 93 cut in the outer peripheral edge of the cam portion 51 of cam disc 50. Ring 92 so received on cam disc 50 has the peripheral edge thereof coincidental with the edge of cam portion 51 and is in alignment with cam follower actuator 74.

Figure 6:
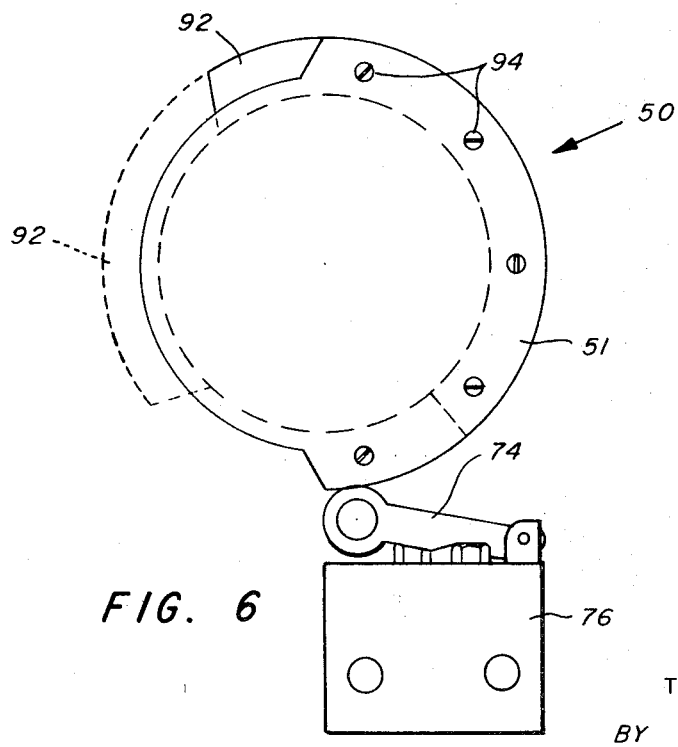
FIG. 6 is a partial side view of the safety stop device showing the cam disc and cam follower actuated valve thereof.

Looking now at FIG. 6, set screws 94 hold the ring in a fixed position. When it is desired to change the profile of the cam disc 50 in order to change the travel length of safety block 16, all that is necessary to do is to loosen set screws 94 and manually slide the cam ring 92 relative to the component 51 until the desired new cam profile is attained which effects the desired length of travel between the stop limit points.

During the detailed description of the preferred embodiment specific language has been used for the sake of clarity; however it is to be understood that the language used are not words of limitation and include all equivalents which operate in a similar manner. As it will be appreciated, the safety bock of this device possesses means for easily adjusting both the upper and lower stop limits of a traveling block and also the length of travel between the stop points.

What is claimed:

1. In a hoist system having a traveling block suspended on a cable driven by a power winding drum mounted on a bidirectional rotatable drive shaft, said drum having a clutch mounted on said shaft of said winding drum and a brake in braking relationship therewith, said brake and said clutch being simultaneously inversely actuated by valve means having a cam follower actuator, a safety apparatus for stopping at upper and lower limits the travel of said block, comprising:

a gear reduction unit interconnected in driving relationship with said drive shaft having an output shaft rotating less than 360° in response to travel of said block between said upper and lower limits;

a cam disc having a cam profile on the circumferential periphery thereof engaging said cam follower actuator of said valve means, said cam follower actuator being responsive to the rotative movement of the said cam disc;

a pair of spaced-apart clutch plates coaxially mounted on said output shaft and rotatable in unison therewith, said cam disc being sandwiched between said clutch plates and rotatable by hand about said output shaft, said clutch plates being longitudinally movable relative to each other between engaged and disengaged positions; and means for longitudinally moving said clutch plates between said engaged and disengaged positions whereby in said engaged position said cam disc is fixedly engaged by said clutch plates to interconnect said cam disc to said output shaft for common rotation therewith and in said disengaged position said cam disc is rotatable by hand relative to said output shaft for adjusting the limits of travel of said block.

2. An apparatus as in claim 1 wherein said cam includes means for adjusting the profile of said cam disc to adjust the length of travel of said block between said stop limits.

* * * * *